US012703213B2

(12) United States Patent
Weicker et al.

(10) Patent No.: US 12,703,213 B2
(45) Date of Patent: Aug. 11, 2026

(54) COMMERCIAL ELECTRIC VEHICLE FRONT SUSPENSION STRUCTURE

(71) Applicant: Harbinger Motors Inc., Garden Grove, CA (US)

(72) Inventors: Phillip John Weicker, Hermosa Beach, CA (US); Alexi Charbonneau, Redondo Beach, CA (US); Kunal Gupta, Tustin, CA (US); Chaiwat Sinthusiri, Irvine, CA (US)

(73) Assignee: Harbinger Motors Inc., Garden Grove, CA (US)

( * ) Notice: Subject to any disclaimer, the term of this patent is extended or adjusted under 35 U.S.C. 154(b) by 0 days.

(21) Appl. No.: 18/974,454

(22) Filed: Dec. 9, 2024

(65) Prior Publication Data

US 2026/0158839 A1 Jun. 11, 2026

(51) Int. Cl.
*B60G 3/20* (2006.01)
*B60G 7/02* (2006.01)
*B60G 21/055* (2006.01)

(52) U.S. Cl.
CPC ................ *B60G 3/20* (2013.01); *B60G 7/02* (2013.01); *B60G 21/0551* (2013.01); *B60G 2200/18* (2013.01); *B60G 2204/422* (2013.01); *B60G 2204/4307* (2013.01)

(58) Field of Classification Search
CPC .. B60G 7/02; B60G 21/0551; B60G 2200/18; B60G 2204/422
See application file for complete search history.

(56) References Cited

U.S. PATENT DOCUMENTS 2,716,461 A 8/1955 Macpherson
3,709,516 A 1/1973 Ewert
3,952,824 A 4/1976 Matschinsky
5,039,124 A 8/1991 Widmer
5,443,130 A 8/1995 Tanaka et al.
10,029,551 B2 7/2018 Ito et al.
10,493,835 B2 12/2019 Ito et al.
10,766,478 B2 9/2020 Healy et al.
10,840,488 B2 11/2020 Izumi et al.
11,161,402 B2 11/2021 McCarron et al.
11,376,970 B2 7/2022 Yu
(Continued)

FOREIGN PATENT DOCUMENTS

CN 110435381 A 11/2019
CN 210416093 A 11/2019
(Continued)

OTHER PUBLICATIONS

Wikipedia, "Constant Velocity Joint", 6 pages, retrieved Oct. 18, 2023. [https://en.wikipedia.org/wiki/Constant-velocityjoint] (Year: 2023).

*Primary Examiner* — Jason D Shanske
*Assistant Examiner* — Tiffany L Webb
(74) *Attorney, Agent, or Firm* — Polygon IP, LLP

(57) ABSTRACT

Described herein are methods and systems of a chassis of a commercial electric vehicle. In various embodiments, the chassis may include a ladder frame with a plurality of frame rails. Batteries and drive units may be packaged within the frame rails of the ladder frame. The chassis may further include an independent front suspension and batteries may be disposed between the suspension members of the independent front suspension.

20 Claims, 9 Drawing Sheets

(56) References Cited

U.S. PATENT DOCUMENTS

| | | | | |
|---|---|---|---|---|
| 11,414,134 | B2 | 8/2022 | Timofeev et al. | |
| 11,833,895 | B2 * | 12/2023 | McCarron | B60G 11/08 |
| 12,011,985 | B2 * | 6/2024 | Charbonneau | B60G 9/027 |
| 12,017,520 | B2 | 6/2024 | Charbonneau et al. | |
| 12,103,375 | B2 * | 10/2024 | McCarron | B60G 7/02 |
| 12,351,011 | B2 * | 7/2025 | Charbonneau | B60G 3/00 |
| 2003/0205880 | A1 | 11/2003 | Walker | |
| 2005/0077137 | A1 | 4/2005 | Nozaki et al. | |
| 2020/0247224 | A1 | 8/2020 | Ito et al. | |
| 2020/0346506 | A1 | 11/2020 | Laforce et al. | |
| 2020/0369140 | A1 | 11/2020 | McCarron et al. | |
| 2021/0218101 | A1 | 7/2021 | Menon et al. | |
| 2022/0032704 | A1 * | 2/2022 | Desourdy | B60G 7/02 |
| 2022/0144032 | A1 | 5/2022 | Brooks et al. | |
| 2022/0194489 | A1 | 6/2022 | Roche et al. | |
| 2022/0289012 | A1 | 9/2022 | Kamimae | |
| 2022/0410990 | A1 | 12/2022 | Rust | |
| 2023/0173866 | A1 * | 6/2023 | Haeusler | B60G 7/02<br>267/246 |
| 2024/0083232 | A1 | 3/2024 | Charbonneau et al. | |
| 2024/0294059 | A1 | 9/2024 | Charbonneau et al. | |
| 2024/0375503 | A1 * | 11/2024 | McCarron | B60K 17/04 |

FOREIGN PATENT DOCUMENTS

| | | | |
|---|---|---|---|
| EP | 1839906 | B1 | 9/2008 |
| WO | 2024054908 | | 3/2024 |

* cited by examiner

COMMERCIAL ELECTRIC VEHICLE FRONT SUSPENSION STRUCTURE

BACKGROUND

Commercial vehicles are typically of ladder frame construction. As upfitting of commercial vehicles is generally through standardized equipment, the frame rails of ladder frame of commercial vehicles are typically separated by a fixed dimension. Such ladder frames are generally of C channel construction and, thus, the vertical elements of the ladder frames are generally maintained at a fixed separation that is substantially normal to the ground plane. Such a configuration results in mounting points on each individual frame rail to be vertically in line with each other.

Commercial vehicles typically utilize solid axle suspension. A few commercial vehicle models have independent front suspension, but, due to geometry constraints on the arrangement of the commercial vehicle ladder frame, those vehicles typically utilize either swing axle suspensions or a variation thereof, such as twin I-beam style suspension. Swing axle suspensions, while independent, are non-ideal from a vehicle dynamic standpoint.

SUMMARY

Described herein are commercial electric vehicles suspensions that utilize upper and lower control arms. One or both of the upper or lower control arm may be coupled to a control arm frame. The control arm frame may be coupled to a top or bottom portion of the ladder frame. The mounting point of the control arm frame for the respective control arm may laterally vary from the mounting point of the ladder frame for its respective control arm.

These and other embodiments are described further below with reference to the figures.

CLAUSES

Clause 1. A commercial electric vehicle comprising: a ladder frame, comprising a first frame rail and a second frame rail; a first control arm frame, disposed below the first frame rail and the second frame rail and coupled to the first frame rail and the second frame rail; a first suspension, comprising: an first upper control arm assembly, coupled to the first frame rail; and a first lower control arm assembly, coupled to the first control arm frame; an electric motor, disposed between the first frame rail and the second frame rail; and a battery pack, configured to provide electrical power to the electric motor, wherein at least a first portion of the battery pack is disposed between the first frame rail and the second frame rail, and wherein at least a second portion of the battery pack is disposed above the first control arm frame.

Clause 2. The commercial electric vehicle of clause 1, further comprising: a second control arm frame, disposed below the first frame rail and the second frame rail and coupled to the first frame rail and the second frame rail, wherein a first portion of the first lower control arm assembly is coupled to the first control arm frame, and wherein a second portion of the first lower control arm assembly is coupled to the second control arm frame.

Clause 3. The commercial electric vehicle of clause 2, wherein the second control arm frame is disposed behind the first control arm frame.

Clause 4. The commercial electric vehicle of clause 3, further comprising: an anti-roll bar; and an anti-roll bar bracket, coupled to the anti-roll bar and connected to the first control arm frame to secure the anti-roll bar to the first control arm frame at a substantially fixed distance.

Clause 5. The commercial electric vehicle of clause 1, wherein the first upper control arm assembly is coupled to the ladder frame at a first point, wherein the first lower control arm assembly is coupled to the first control arm frame at a second point laterally offset from the first point.

Clause 6. The commercial electric vehicle of clause 5, wherein the second point is inboard of the first point.

Clause 7. The commercial electric vehicle of clause 1, wherein the first lower control arm assembly comprises: a bushing; and a bar pin, disposed within the bushing, wherein the bar pin is coupled to the first control arm frame.

Clause 8. The commercial electric vehicle of clause 7, further comprising: a first fastener, wherein the first fastener couples the bar pin to the first control arm frame and further couples the first control arm frame to the first frame rail.

Clause 9. The commercial electric vehicle of clause 1, wherein the first control arm frame comprises a first frame attachment point and a second frame attachment point, wherein each of the first frame attachment point and the second frame attachment point are configured to couple to the first lower control arm assembly, and wherein the first lower control arm assembly is coupled to the first frame attachment point.

Clause 10. The commercial electric vehicle of clause 1, wherein the first frame rail comprises a first rail attachment point and a second rail attachment point, wherein each of the first rail attachment point and the second rail attachment point are configured to couple to the first upper control arm assembly, and wherein the first lower control arm assembly is coupled to the first rail attachment point.

Clause 11. The commercial electric vehicle of clause 1, wherein the first upper control arm assembly comprises an upper control arm, wherein the first lower control arm assembly comprises a lower control arm, and wherein the lower control arm is longer than the upper control arm.

Clause 12. The commercial electric vehicle of clause 1, wherein the first suspension further comprises: an upright, coupled to the first upper control arm assembly and the first lower control arm assembly; and a wheel, coupled to the upright.

Clause 13. The commercial electric vehicle of clause 1, further comprising: a second suspension, disposed opposite the first suspension on the commercial electric vehicle and comprising: a second upper control arm assembly, coupled to the second frame rail; and a second lower control arm assembly, coupled to the first control arm frame.

Clause 14. The commercial electric vehicle of clause 13, wherein: the first suspension further comprises a first damper; the second suspension further comprises a second damper; the first frame rail comprises a first shock mount, wherein the first damper is coupled to the first shock mount; and the second frame rail comprises a second shock mount, and wherein the second damper is coupled to the second shock mount.

Clause 15. The commercial electric vehicle of clause 14, further comprising: a shock mount brace, coupled to and spanning across the first shock mount and the second shock mount.

Clause 16. The commercial electric vehicle of clause 15, wherein the shock mount brace is disposed above the battery pack.

Clause 17. The commercial electric vehicle of clause 13, further comprising:

a second control arm frame, disposed below the first frame rail and the second frame rail and coupled to the first frame rail and the second frame rail, wherein the first lower control arm assembly and the second control arm assembly are further coupled to the second control arm frame.

Clause 18. The commercial electric vehicle of clause 1, wherein the second control arm frame is disposed behind the first control arm frame.

Clause 19. The commercial electric vehicle of clause 1, wherein the first control arm frame is of a forged construction.

Clause 20. The commercial electric vehicle of clause 1, wherein the first frame rail comprises a vertical portion, a top horizontal portion coupled to the vertical portion, and a bottom horizontal portion coupled to the vertical portion, and wherein the first control arm frame is coupled to the bottom horizontal portion.

DETAILED DESCRIPTION

Figure 1:
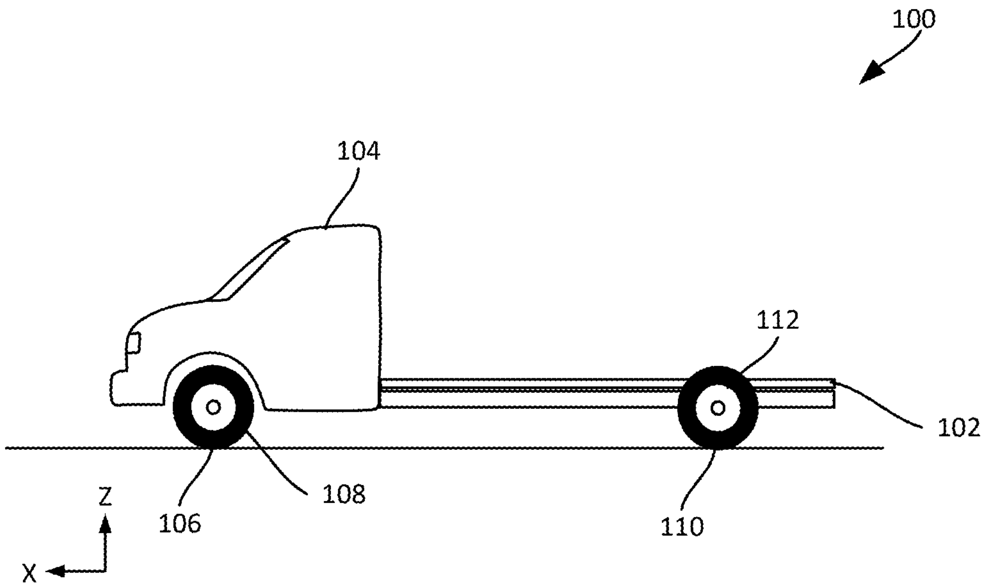
FIG. 1 illustrates a side view of a commercial electric vehicle, in accordance with certain embodiments.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

It is to be appreciated that the electric vehicles described herein may include both a left and a right side. In certain figures, for simplicity purposes, element numbers may be provided for only components on one side of the vehicle. However, it is appreciated that such elements, and description provided herein, may also be disposed on the other side of the vehicle (e.g., as illustrated in the accompanying figures). In other figures, both the equivalent left and right components may be provided, such as in FIG. 4. In such figures, elements on one lateral side may include an ordinal indicator and a letter (e.g., "suspension 460A") while the equivalent elements on the other lateral side may include the same ordinal indicator, but a different letter (e.g., "suspension 460B").

It is appreciated that, for the purposes of this disclosure, when an element includes a plurality of similar elements distinguished by a letter following the ordinal indicator (e.g., "460A" and "460B") and reference is made to only the ordinal indicator itself (e.g., "460"), such a reference is applicable to all the similar elements.

As described herein, "coupled to" may refer to an element that is directly or indirectly connected to another element. Such elements may be coupled via any appropriate permanent (e.g., unremovable without destruction), semi-permanent (e.g., removable through removal of other components), and/or temporary (e.g., directly removable) technique. Elements that are coupled together may be coupled in a fixed or movable relationship.

The vehicle and components described herein may be referred to in a standardized coordinate system. That is, positioning of the components of the vehicle may be defined as longitudinally along the X axis shown in the figures, laterally along the Y axis shown in the figures, and height wise along the Z axis shown in the figures.

Introduction

Commercial vehicles typically utilize ladder frame chassis. As upfitting equipment for commercial vehicles include standardized mounting point spacing, the frame rails of ladder frame of commercial vehicles are typically separated by a fixed dimension. Accordingly, for example, medium duty commercial vehicles available in the United States all include a 34 inch spacing between the frame rails. Other commercial vehicles may include other standardized width measurements. As the frame rails of ladder frames are generally of C channel construction, mounting of outward spanning components are often only possible along the vertical elements of the frame rails. Since the vertical elements are vertically oriented normal to the road surface, commercial vehicle frame rails typically require that all components mounted to an individual frame rail be mounted in the same vertical plane.

Described herein are commercial electric vehicles (EVs) suspensions that utilize upper and lower control arms. The upper and lower control arms may be unequal length. In various embodiments, one of either the upper or lower control arm may be coupled to the ladder frame and the other of the upper or lower control arm may be coupled to a control arm frame. The control arm frame may be coupled to a top or bottom portion of the ladder frame. The mounting point of the control arm frame for the respective control arm may laterally vary from the mounting point of the ladder frame for its respective control arm. Thus, such a configuration allows for an unequal length control arm configuration for a commercial vehicle.

Vehicle Examples

FIG. 1 illustrates a vehicle, in accordance with certain embodiments. FIG. 1 illustrates vehicle 100 that includes chassis 102, cab 104, front tire 106, front wheel 108, rear tire 110, and rear wheel 112. In certain embodiments, vehicle 100 may be a commercial vehicle with electric propulsion. The front of vehicle 100 may be defined as the forward end (e.g., the end of vehicle 100 that is closer to front wheel 108 than rear wheel 112) and the rear of vehicle 100 may be defined as the rearward end (e.g., the end of vehicle 100 that is closer to rear wheel 112 than front wheel 108).

Vehicle 100 may represent any type of commercial vehicle, such as a vehicle with an integrated cargo volume, (e.g., a delivery van or a box truck), a flatbed truck, a pickup truck, a truck with an enclosed cargo box, a towing vehicle, and/or any other such commercial vehicle. Chassis 102 may be any type of appropriate chassis, such as a ladder frame, unibody, monocoque, semi-monocoque, and/or other such type of chassis that may allow for vehicle 100 to provide load-carrying and/or towing ability. Though not illustrated in FIG. 1, vehicle 100 may additionally include one or more of a flatbed, truck bed, cargo container, cabin, and/or other compartment for carrying loads and/or performing tasks. In certain embodiments, vehicle 100 may be powered by one or more electric drive units (e.g., electric motors and drivetrains for the electric motors) that are mounted in various portions of vehicle 100. For example, vehicle 100 may mount one or more electric motors in front of tire 110 and wheel 112, within the frame rails of 102, and/or within another portion of vehicle 100. In certain embodiments, vehicle 100 may be pure electric (e.g., only powered by one or more electric drive units) or may include a combustion motor for range extension, as an auxiliary power source, and/or as an alternative drive unit.

Chassis Examples

Figure 2:
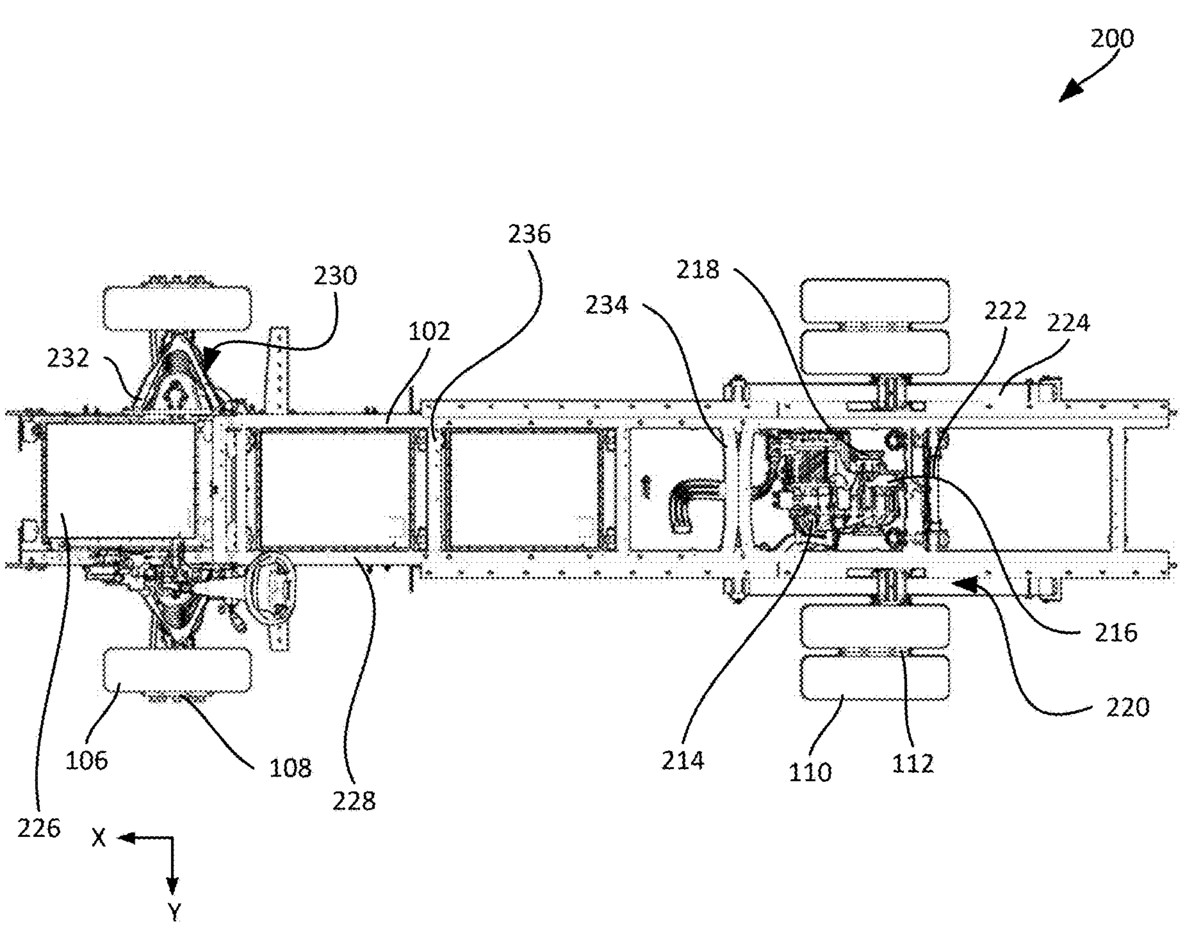
FIG. 2 illustrates a top view of a commercial electric vehicle chassis, in accordance with certain embodiments.

FIG. 2 is a top view of a commercial electric vehicle chassis, in accordance with certain embodiments. FIG. 2 illustrates vehicle architecture 200 which includes chassis 102, front tire 106, front wheel 108, rear tire 110, rear wheel 112, electric motor 214, drivetrain 216, CV axle 218, rear suspension 220, battery 226, and front suspension 230. Chassis 102 includes frame rails 228, crossmembers 234, and crossmembers 236. Rear suspension 220 includes de Dion axle 222 and leaf spring 224. Front suspension 230 includes control arm 232. Drivetrain 216 is coupled to electric motor 214 and configured to output power produced by electric motor 214 to rear wheel 112 via CV axle 218. Drivetrain 216 and electric motor 214 may form an electric drive unit.

In various embodiments, electric motor 214 may be any type of electrified (e.g., pure electric or hybrid) drive unit that is configured to power and provide at least partially electrified propulsion to vehicle 100 (which vehicle architecture 200 may be a portion thereof). Thus, electric motor 214 may be, for example, any type of direct current (DC) or alternating current (AC) electric motor that may provide motive force. The motive force may be transmitted via drivetrain 216, which may be a direct drive, a gear reduction, and/or a multi-speed transmission or transaxle. Drivetrain 216 may include an output shaft or cavity that may be configured to receive a portion of CV axle 218 and provide motive force to CV axle 218.

As shown in FIG. 2, electric motor 214 and/or drivetrain 216 may be disposed proximate to rear wheel 112. As shown in FIG. 2, electric motor 214 and drivetrain 216 are disposed in front of de Dion axle 222. CV axle 218 may transmit motive force from drivetrain 216 to rear wheel 112. Such a configuration may not include a propshaft or other driveshaft that couples electric motor 214 and/or drivetrain 216 with CV axle 218. Instead, drivetrain 216 may be a transaxle and CV axle 218 may transit motive force in the lateral (y) direction, while no driveshafts are oriented in the longitudinal (x) direction.

CV axle 218 allows for motive force to be transmitted from drivetrain 216 to rear wheel 112 while there is a degree of misalignment between drivetrain 216 and rear wheel 112 (e.g., the CV cups of CV axle 218 may operate at a misalignment angle). CV axle 218 allows for electric motor 214 and drivetrain 216 to be mounted to chassis 102 without the use of a Hotchkiss drive to transmit torque to rear tire 110. Otherwise, such a Hotchkiss drive may take up space between frame rails 228 of chassis 102 and result in parasitic losses and, thus, decrease efficiency. Furthermore, disposing of electric motor 214 and/or drivetrain 216 on an axle (e.g., live axle) of vehicle architecture 200 may subject electric motor 214 and/or drivetrain 216 to unacceptably high levels of bumps and vibration, increasing the likelihood of failure and decreasing reliability. For vehicle architecture 200, electric motor 214 and drivetrain 216 are mounted to chassis 102 (instead of to rear suspension 220) to improve reliability and isolate electric motor 214 and drivetrain 216 from shocks from, for example, bumps and other operating shocks and vibrations and, thus, avoid the disadvantages of mounting electric motor 214 and/or drivetrain 216 to a live axle.

CV axle 218 allows for electric motor 214 and drivetrain 216 to be disposed on chassis 102 while powering rear wheel 112. CV axles typically operate most reliably when the misalignment angle is as low as possible. CV axles are also generally utilized in independent suspension arrangements, which do not have the load carrying capacity of a beam axle (e.g., live or dead axle) type suspension. For vehicle architecture 200, rear suspension 220 includes de Dion axle 222. De Dion axle 222 may be curved in one or more axes to allow for electric motor 214 and/or drivetrain 216 to be disposed close to the axle centerline (e.g., the axle centerline of the rear wheels may intersect at least a portion of electric motor 214 and/or drivetrain 216) to minimize the misalignment angle of CV axle 218. Such a configuration may allow for the load carrying capacity of a beam axle while avoiding the need for a central propshaft to transfer propulsive force by disposing electric motor 214 and/or drivetrain 216 proximate to rear wheel 112 in a transaxle configuration. The elimination of the central propshaft provides space for packaging, such as space for batteries to be disposed between the frame rails 228 of chassis 102.

Battery 226 may provide electrical power to electric motor 214. Thus, battery 226 may store electrical charge that may be communicated to electric motor 214 and power electric motor 214 such that electric motor 214 generates rotational force. Battery 226 may include one or a plurality of battery packs that may each include one or a plurality of battery modules. Battery 226 may be any type of battery appropriate for powering an electrified vehicle, such as nickel metal hydride, lithium ion, lithium iron phosphate, and/or other such types of batteries.

Due to the location of electric motor 214 and drivetrain 216 of vehicle architecture 200, various packs of battery 226 may be disposed within frame rails 228 of chassis 102. In a typical configuration with a driveshaft such as a Hotchkiss drive, the driveshaft would be disposed within the space between frame rails 228, preventing one or more packs of battery 226 from being disposed within frame rails 228. Furthermore, the front suspension and steering gear and/or a front mounted motor would be disposed in the space within frame rails 228 between the front wheels. In various embodiments of vehicle architecture 200, packs of battery 226 may be disposed both in front of (e.g., towards the front of the vehicle) and behind (e.g., towards the rear of the vehicle) electric motor 214 and/or drivetrain 216. Additionally, one or more packs of battery 226 may be disposed between portions of front suspension 230.

Vehicle architecture 200 provides packaging benefits by disposing battery 226, electric motor 214, and drivetrain 216 within the frame rails of chassis 102. Accordingly, all or the majority of the main motive components of vehicle architecture 200 may be disposed between the frame rails of chassis 102, providing protection for such elements.

A typical commercial vehicle utilizes a beam axle front suspension. The beam axle front suspension requires that the floor of the frame of the vehicle be elevated in order to provide space for movement of the beam axle (e.g., due to bumps, roll, and/or other suspension movement). The elevated floor renders the space above the front suspension unsuitable for battery packaging or at least would lead to an undesirable increase in center of gravity height if batteries were disposed in that location, as well as decreasing crash protection and resulting in various other undesirable vehicle characteristics.

Front suspension 230 of vehicle architecture 200 utilizes independent front suspension that includes one or more control arm 232. In certain embodiments, front suspension 230 may be a double wishbone or control arm suspension that includes an upper control arm and a lower control arm. Other embodiments of front suspension 230 may include strut, multi-link, swing arm, trailing arm, and/or other types of independent front suspension.

Independent front suspension 230 allows for a low load floor and for batteries to be disposed in the portion of frame rails 228 between front suspension 230. Such batteries may be disposed at a low height, as no portion of front suspension 230 may be located within frame rails 228 or require raising of frame rails 228 proximate to front suspension 230. Furthermore, the independent configuration of front suspension 230 allows for a passenger vehicle like driving experience, reducing the need for driver training for driving commercial electric vehicle 100 and, thus, increasing the available driver pool and mitigating against potential driver shortages.

Furthermore, such a configuration may allow for the mounting of a plurality of battery packs between front suspension 230. The packs may be at least partially stacked one above another. The lowest battery pack is mounted low between front suspension 230. The positioning of such a battery pack may mitigate the center of gravity effects of the higher mounted pack. Furthermore, the configuration of vehicle architecture 200 may allow for such a stacking arrangement, which may not be possible in a convention architecture with a beam axle suspension. Mounting a plurality of battery packs between front suspension 230 may shift the weight distribution of vehicle 100 forward and such a forward shift in weight distribution may allow for an increase in payload of vehicle 100, which is important for commercial vehicles where payload determines the usefulness of the vehicle. Conversely, for architectures where battery packs are only mounted behind the front axle, the weight distribution of the vehicle may be shifted too far rearward to allow for safe handling with an equivalent payload as that of vehicle architecture 200, requiring a decrease in rated payload.

The various configurations and features of vehicle architecture 200 may be further described herein.

Figure 3:
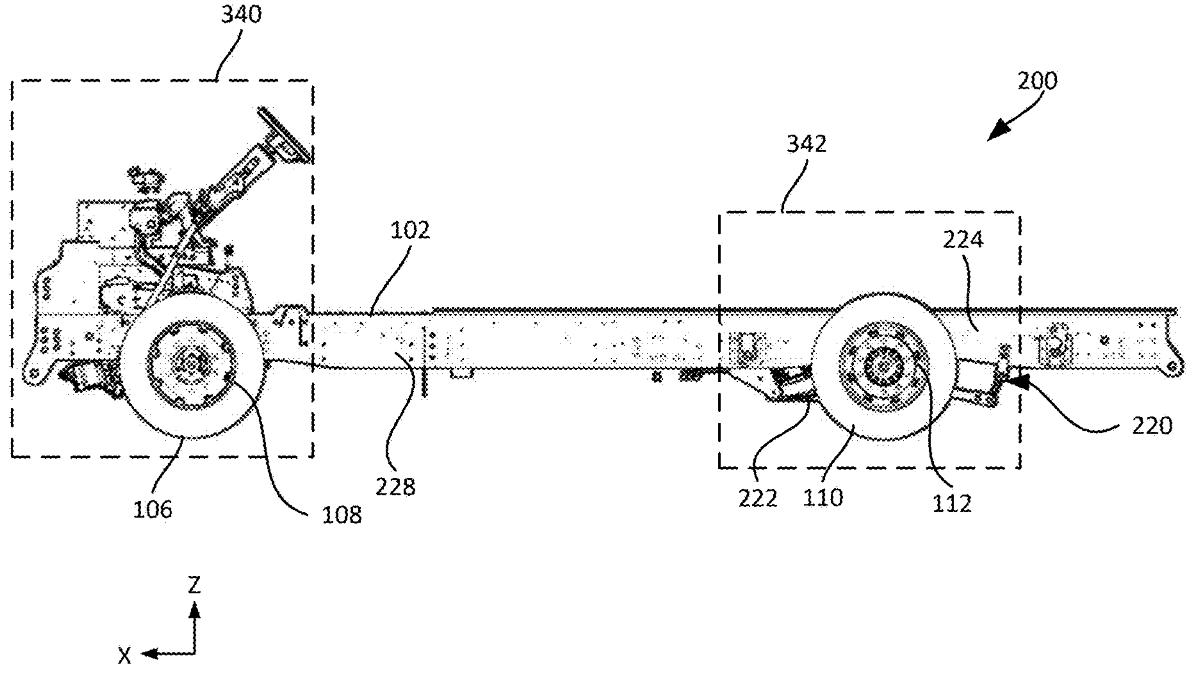
FIG. 3 illustrates a side view of a commercial electric vehicle chassis, in accordance with certain embodiments.

FIG. 3 illustrates a side view a commercial electric vehicle chassis, in accordance with certain embodiments. FIG. 3 is a partial side view of vehicle architecture 200. As shown in FIG. 3, vehicle architecture 200 may include front suspension area 340 and rear suspension area 342. In certain embodiments, rear suspension 220 may be disposed within rear suspension area 342 and front suspension 230 (not shown in FIG. 3, but shown in FIG. 2) may be disposed within front suspension area 340.

As described herein, due to the independent configuration of front suspension 230, the portion of frame rails 228 ("first portion" of frame rails 228) within front suspension area 340 may be level or substantially level with that of the majority of frame rails 228 (e.g., the portions that span the majority of the distance between front wheel 108 and rear wheel 112). That is, the bottom of frame rails 228 disposed within front suspension area 340 may be colinear or may be linearly in line with the majority of other portions of frame rails 228 (e.g., the portions that span the majority of the distance between front wheel 108 and rear wheel 112). Thus, unlike what is required when utilizing a beam axle front suspension, frame rails 228 within front suspension area 340 do not need to be raised.

The portion of frame rails 228 ("second portion" of frame rails 228) within rear suspension area 342 may be notched due to the configuration of the rear suspension 220. As rear suspension 220 includes a beam axle (e.g., de Dion axle 222), chassis 102 (e.g., frame rails 228) are shaped so that movement of the beam axle does not result in contact with that of frame rails 228. Accordingly, the bottom portion of frame rails 228 within rear suspension area 342 is notched to prevent contact with de Dion axle 222. The floor of vehicle 100 utilizing vehicle architecture 200 may, thus, be operated at a lower ride height or include a lower floor height (e.g., due to the lower height of frame rails 228), decreasing cargo lift height. Additionally, notching of frame rails 228 within rear suspension area 342 allows for the CV axles coupled to drivetrain 216 to be operated at a lower vertical misalignment angle or no misalignment angle at all (at a certain load and static ride height), increasing the longevity of the CV axles.

Front Suspension Examples

Figure 4:
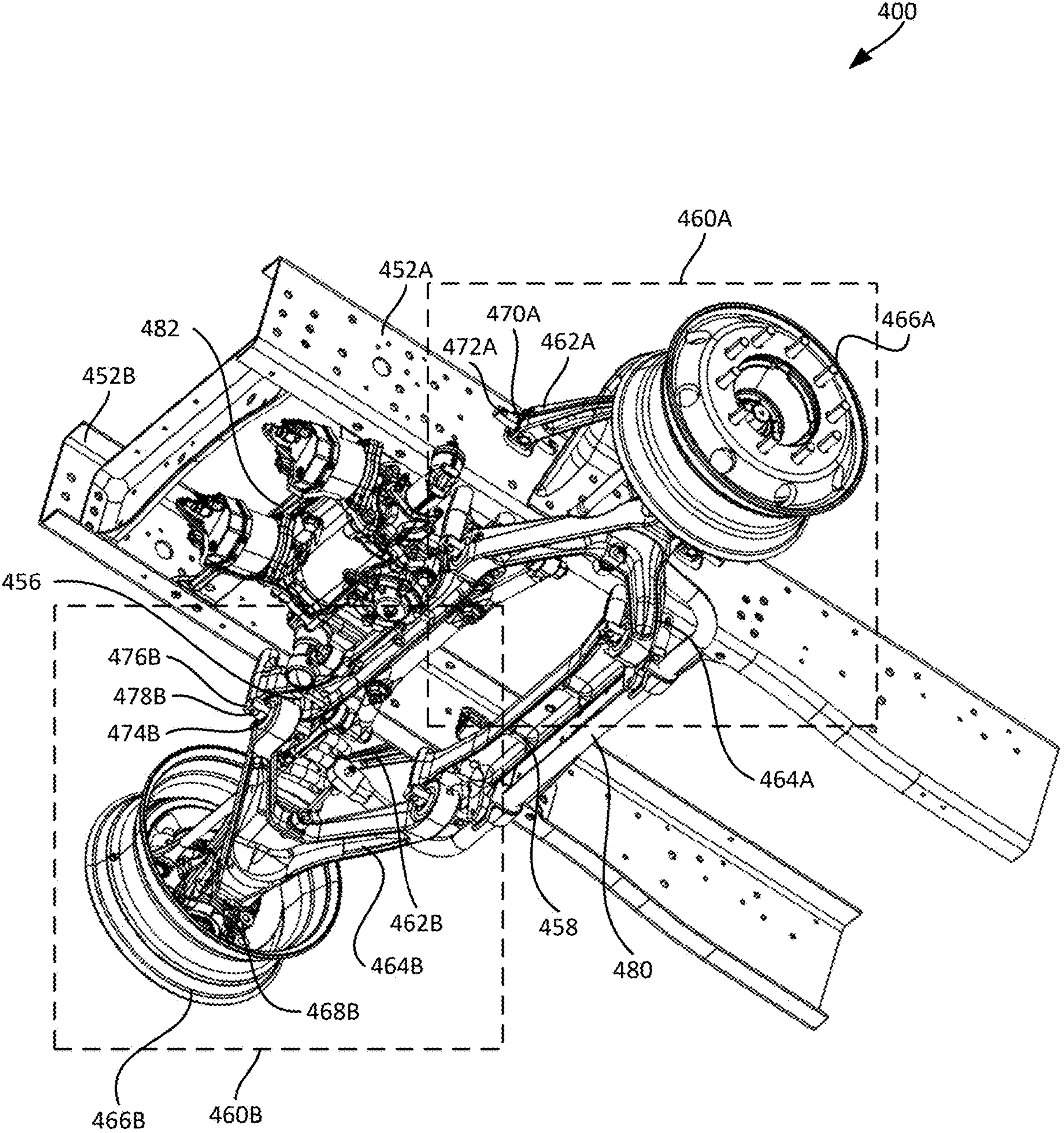
FIG. 4 illustrates a bottom perspective view of a commercial electric vehicle chassis, in accordance with certain embodiments.
Figure 5:
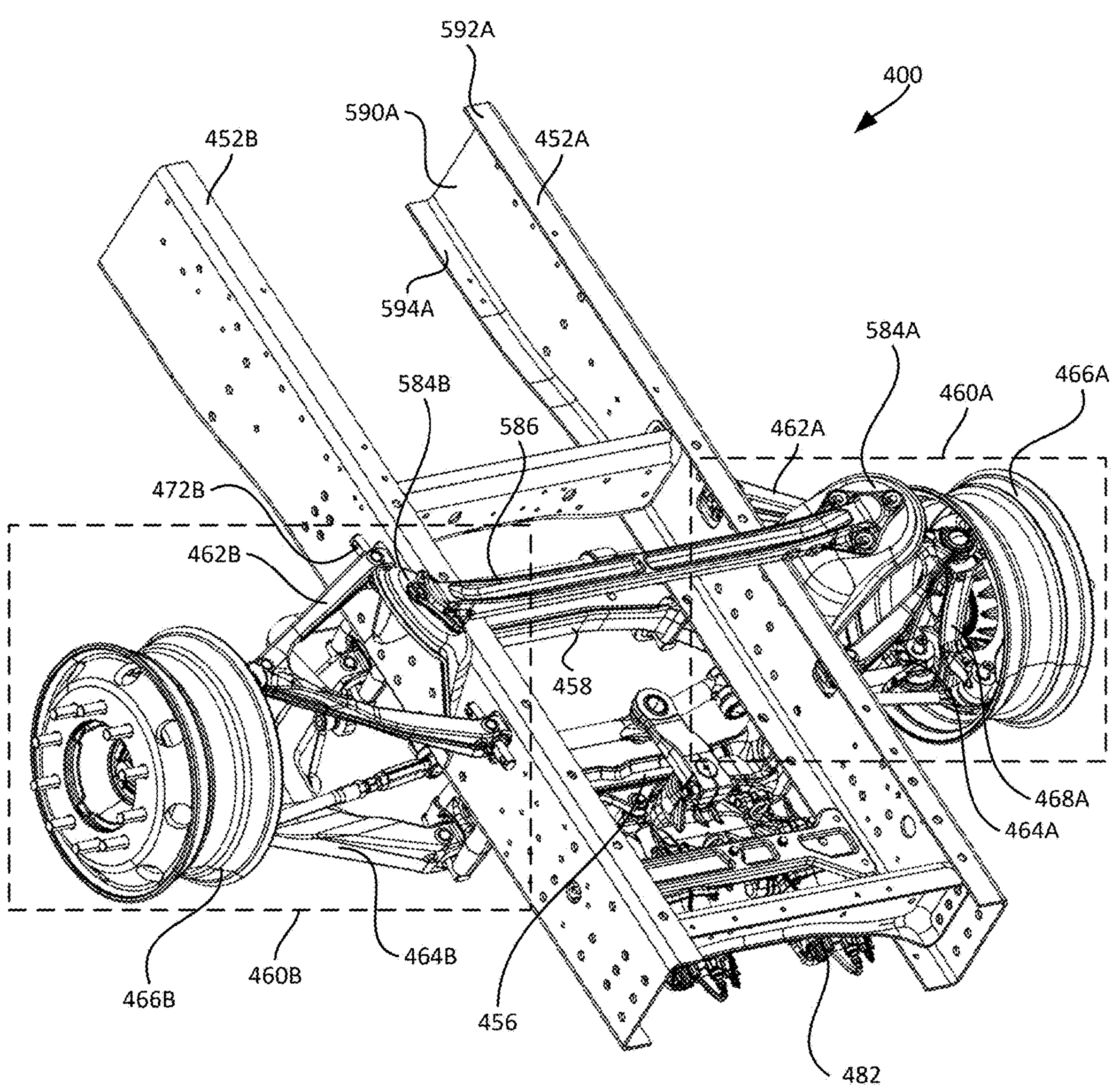
FIG. 5 illustrates a top perspective view of a commercial electric vehicle chassis, in accordance with certain embodiments.

FIG. 4 illustrates a bottom perspective view of a commercial electric vehicle chassis, in accordance with certain embodiments. FIG. 5 illustrates a top perspective view of a commercial electric vehicle chassis, in accordance with certain embodiments. FIGS. 4 and 5 illustrate suspension configuration 400. Suspension configuration 400 may include frame rails 452A and 452B, component 482, anti-roll bar 480, control arm frame 456, control arm frame 458, and suspensions 460A and 460B. In various embodiments, suspension 460 may include a plurality of different separable portions and the totality of such portions may be referred to as a suspension assembly.

Frame rails 452A and 452B may be opposing frame rails of a ladder frame. Thus, frame rails 452A and 452B may be spaced apart an industry standard width to accommodate various upfitting components. Thus, for example, frame rails 452A and 452B may include a 34 inch spacing between frame rails 452A and 452B or another standardized measurement. In certain embodiments, frame rails 452A and 452B may be coupled together with various cross members and/or control arm frames.

Each frame rail 452 may include vertical portion 590, top horizontal portion 592 and bottom horizontal portion 594. Top horizontal portion 592 and bottom horizontal portion 594 may each be coupled to vertical portion 590. Top horizontal portion 592, vertical portion 590, and bottom horizontal portion 594 may form a C shape and, thus be a C channel frame rail. In various embodiments, top horizontal portion 592 may be configured to provide mounting points and surfaces for the vehicle body, control arm frames, and/or upfitting equipment. Vertical portion 590 may provide mounting points and surfaces for certain components of the vehicle, including outward spanning components such as one or more control arms of the vehicle, as described herein. Bottom horizontal portion 594 may be configured to provide mounting points for downward facing items, such as control arm frames. Other embodiments of frame rails 452 may provide for boxed frame rails or frame rails of other shapes, but it is appreciated that the systems and techniques described herein are compatible with such frame rail shapes.

Control arm frame 456 and control arm frame 458 may be coupled to frame rails 452A and 452B. Thus, control arm frame 456 and control arm frame 458 may be cross braces coupled to frame rails 452A and 452B. In various embodiments, one or both of control arm frame 456 and control arm frame 458 may be bent and welded sheetmetal or a metal or composite structure that is machined, forged, cast, and/or formed through another technique.

Each of control arm frame 456 and control arm frame 458 may be coupled to a portion of frame rails 452A and 452B. In various embodiments, control arm frame 456 and/or control arm frame 458 may be coupled between frame rails 452A and 452B (e.g., to vertical portion 590), coupled to the bottom of frame rails 452A and 452B (e.g., to bottom horizontal portion 594), and/or coupled to the top of frame rails 452A and 452B (e.g., to top horizontal portion 592). It is appreciated that, in certain embodiments, control arm frame 456 and control arm frame 458 may be coupled to one or more portions of frame rails 452A and 452B.

Control arm frame 456 and/or control arm frame 458 may be disposed above, between, or below frame rails 452A and 452B. In certain embodiments, control arm frame 456 and/or control arm frame 458 may be disposed above or below frame rails 452A and 452B. For certain such embodiments, a battery may be disposed between frame rails 452A and 452B and control arm frame 456 and/or control arm frame 458 may be disposed above or below the battery. For example, FIG. 4 illustrates an embodiment where control arm frame 456 and control arm frame 458 may be disposed below frame rails 452A and 452B and, thus, below any batteries disposed between frame rails 452A and 452B.

Control arm frame 456 and control arm frame 458 may each be configured to couple to and support one or more suspension control arms. That is, one or more suspension control arms may be mounted to control arm frame 456 and/or control arm frame 458. Mounting of such suspension control arms to control arm frame 456 and/or control arm frame 458 allows for control arms to be mounted in vertical and lateral locations that are different from the vertical and lateral locations of frame rails 452A and 452B, allowing for greater flexibility in mounting of such control arms and, thus, providing more optimized suspension geometries. While the embodiment of suspension configuration 400 includes two control arm frames, control arm frame 456 and control arm frame 458, it is appreciated that other embodiments may include any number of control arm frames, including one control arm frame or three or more control arm frames.

As shown in FIG. 4, a single control arm may be coupled to a plurality of different control arm frames. For example, control arm 466 may be coupled to both control arm frame 456 and control arm frame 458. Control arm frame 456 may be the forward mounting point of control arm 466 and control arm frame 458 may be the rearward mounting point of control arm 466.

Control arm frames may allow for portions of suspensions 460A and 460B to have mounting points that are disposed above or below frame rails 452A and 452B. For example, in certain embodiments, it may be advantageous to have mounting points that are offset from where frame rails 452A and 452B are positioned.

Furthermore, certain commercial vehicles may include a solid axle rear suspension. Solid axles, as they span the width of the vehicle, are typically disposed below the frame rails of a vehicle. An independent suspension typically includes a lower control arm disposed below the centerline of the vehicle. Mounting such a lower control arm to one or more control arm frames that are separate (e.g., can be decoupled from) from the ladder frames allows for the frame rails at the front of the vehicle to extend linearly backwards (e.g., without utilizing any jogs and/or cutouts to accommodate the suspension).

In various embodiments, suspensions 460A and 460B may be independent suspensions, such as independent front suspensions. In such certain embodiments, suspensions 460A and 460B may be, for example, a double wishbone suspension, a multi-link suspension, a strut suspension, a trailing arm suspension, and/or another type of independent suspension. Thus, for example, each of suspensions 460A and 460B may include upper and lower control arms, such as control arm 462 and control arm 464, respectively. A first end of control arm 462 and/or control arm 464 may be coupled to one of frame rails 452A or 452B and/or to one of the control arm frames (e.g., control arm frame 456 and/or control arm frame 458). It is appreciated that the first end may include a plurality of different protrusions and, thus, a plurality of different mounting points. Accordingly, the first end may be mounted to a plurality of different components. A second end of control arm 462 and/or control arm 464 may be coupled to upright 468. Upright 458 may be configured to mount or incorporate hubs, brakes, steering arms, and/or other such components. Wheel 466 may be coupled to such components of upright 458.

In various embodiments, control arm 462 and/or control arm 464 may be coupled to frame rail 452 and/or one or more control arm frames via any mounting technique. For example, bearings, bushings, bar pins, and/or other mounting techniques may be utilized to couple a control arm to the frame rail and/or control arm frame. In a certain example, such a fastener may include a bushing disposed within the control arm and a mounting bolt or other mounting bar that the bushing is configured to rotate on.

In another example, control arm 462 may include bushing 470 and control arm 464 may include bushing 474. Bar pin 472 and/or bar pin 476 may be disposed within bushing 470 and bushing 474, respectively. Thus, in the embodiment shown in FIGS. 4 and 5, bar pin 472 may be coupled to frame rail 452 via one or more fasteners to couple a portion of suspension 460 to frame rail 452 and bar pin 476 may be coupled to control arm frame 456 to couple a portion of suspension 460 to control arm frame 456.

In various embodiments, a bar pin may be coupled to a frame rail and/or control arm frame via one or more mechanical fasteners. Such mechanical fasteners may include, for example, a bolt, nut, standoff, quick release fastener, and/or other such mechanical fastener that allows for coupling and decoupling of two or more items. Thus, for example, fastener 478 may be disposed within a hole of bar pin 476 and threaded into control arm frame 456 and/or frame rail 452. For example, frame rail 452 may include a threaded receiver and fastener 478 may couple bar pin 474 (and, thus, control arm 464) and control arm frame 456 to frame rail 452. Thus, a single fastener may be utilized to couple a control arm and its associated control arm frame to the frame rail. A plurality of fasteners may couple a bar pin to its associated control arm frame and/or frame rail (e.g., fasteners on opposing ends of the bar pin). Control arm frame 458 may be similarly coupled to the frame rails.

In various embodiments, fastener 478 may be vertically inserted into the respective control arm frame and/or frame rail. Other embodiments, may include a fastener that is horizontally inserted or inserted at another angle, such as the fastener for bar pin 472. Vertically disposing fastener 478 allows for fastener 478 to be easily inserted into and through bar pin 476 and a mounting hole of control arm frame 456 into a threaded portion of frame rail 452, allowing for one fastener to be used to couple both bar pin 476 and control arm frame 456 to frame rail 452.

Various components may be coupled to one or more control arm frames. For example, component 482 may be coupled to control arm frame 456 and anti-roll bar 480 may be coupled to control arm frame 458. Such components may be coupled via one or more fasteners or other such techniques. In various other embodiments, other components may be coupled to various control arm frames.

In various embodiments, mounting of one or more control arms (e.g., a lower control arm) to a control arm frame allows for a commercial vehicle to include favorable front suspension geometry while utilizing a double control arm front suspension. Furthermore, mounting of one or more control arms to the control arm frame instead of the frame rails allows for the frame rails of the vehicle to be arranged in a linear manner, minimizing jogs or cutouts within the frame and, thus, improving the strength of the frame while still providing a relatively low ground clearance.

Figure 6:
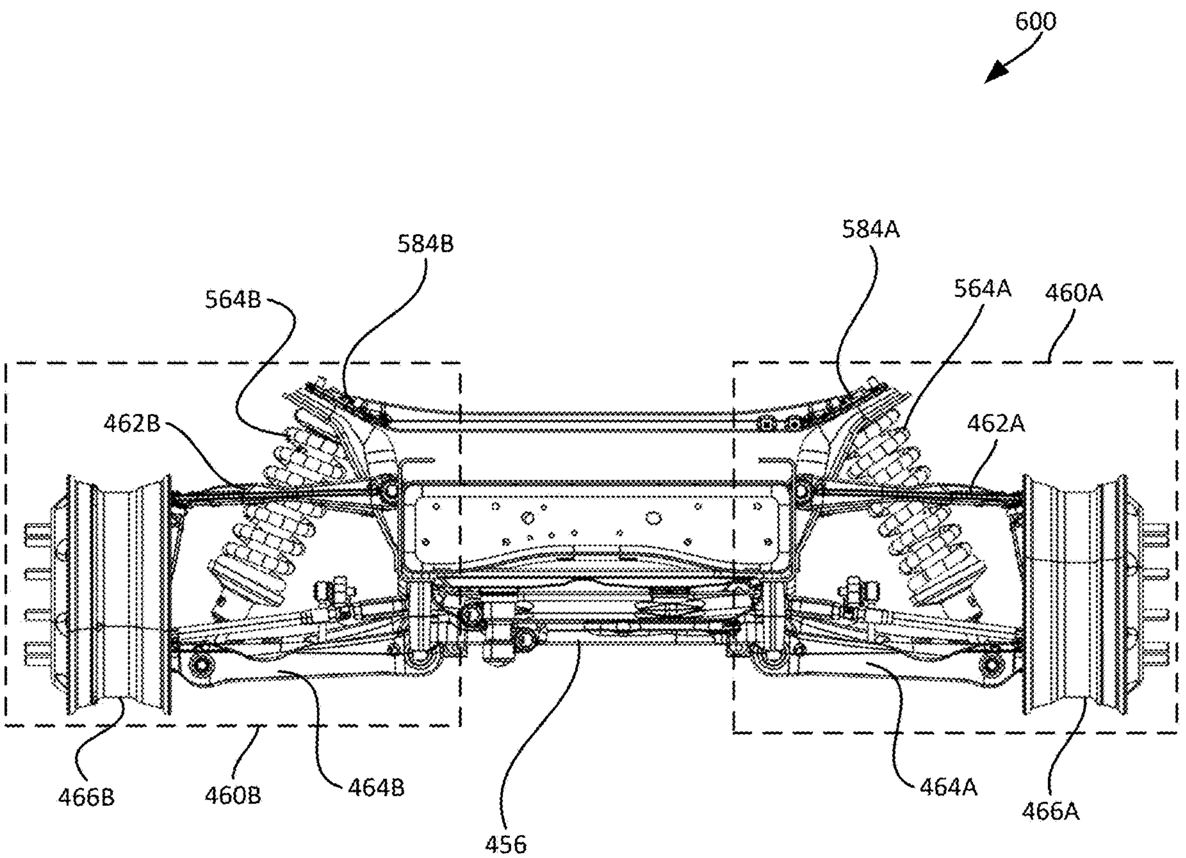
FIG. 6 illustrates a front view of a commercial electric vehicle chassis, in accordance with certain embodiments.

FIG. 6 illustrates a front view of a commercial electric vehicle chassis, in accordance with certain embodiments. FIG. 6 illustrates suspension configuration 600, which may be similar to suspension configuration 400. In suspension configuration 600, springing and/or damping of suspension 460 may be provided by coilover 564. In various embodiments, coilover 564 may include a damper and/or a spring. Coilover 564 may be any damping and/or springing element for a suspension. A first end of coilover 564 may be coupled to a control arm, such as control arm 464, and a second end of coilover 564 may be coupled to shock tower 584. In various embodiments, shock tower 584 may be coupled to or is formed as a portion of frame rail 452.

In certain embodiments, shock mount brace 586 may span shock towers 584A and 584B. Shock mount brace 586 may provide for increased stiffness between shock towers 584A and 584B.

Figure 7:
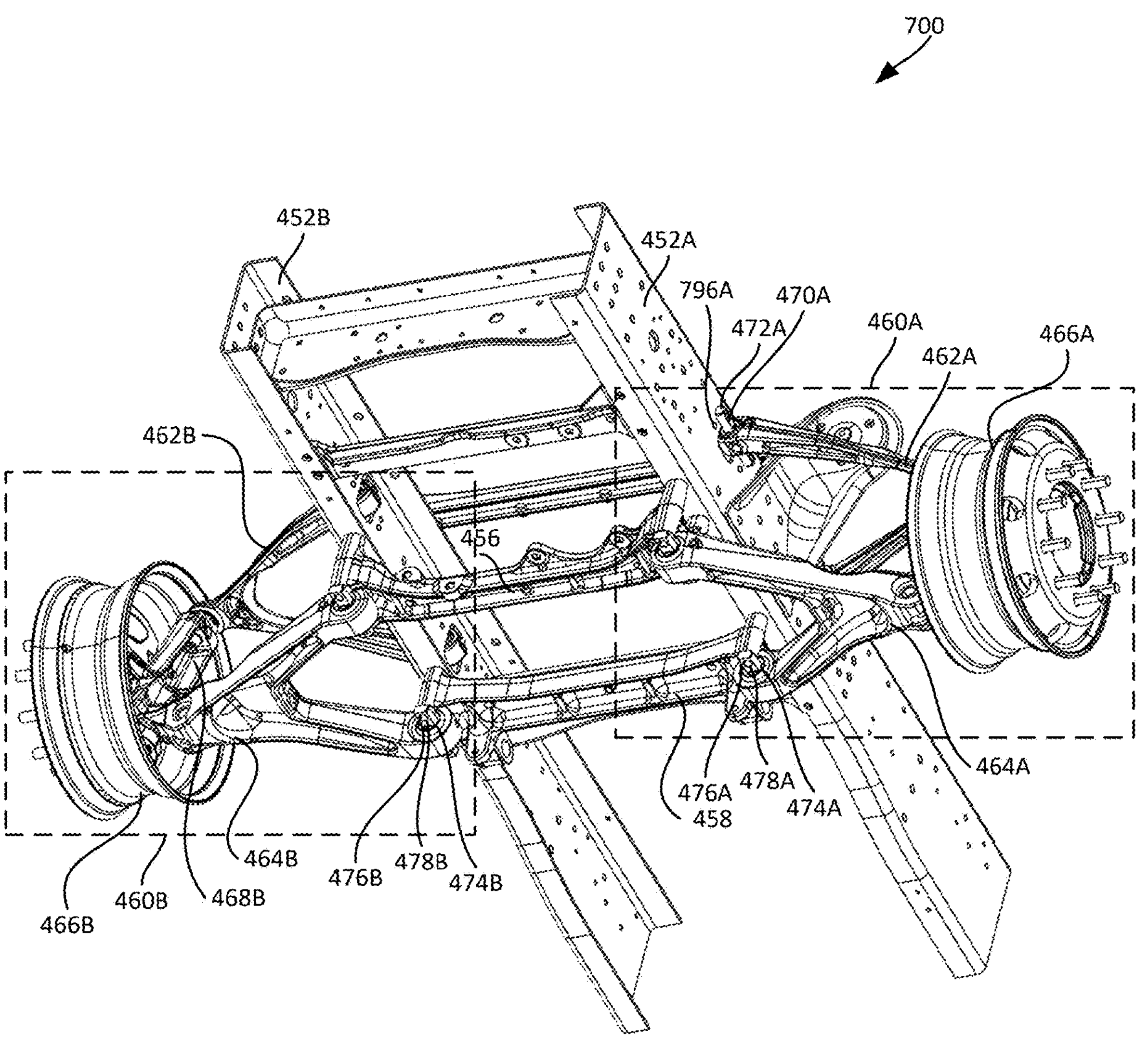
FIG. 7 illustrates a further bottom perspective view of a commercial electric vehicle chassis, in accordance with certain embodiments.

FIG. 7 illustrates a further bottom perspective view of a commercial electric vehicle chassis, in accordance with certain embodiments. FIG. 7 illustrates suspension configuration 700. Suspension configuration 700 may further illustrate mounting of control arms to portions of the vehicle.

For example, as shown in suspension configuration 700, a control arm may be coupled to frame rail 452 and/or a control arm frame via a bar pin. Fastener 478 may couple bar pin 476 of control arm 464 and/or control arm frame 458 to frame rail 452, as described herein.

In various embodiments of suspension configuration 700, the positioning of the control arms may be adjusted. Thus, for example, bar pin 472 may be coupled to a fastener receiver on frame rail 452. Frame rail 452 may additionally include fastener receiver 796, which may be another fastener receiver that bar pin 472 may couple to. Coupling of bar pin 472 of control arm 462 to fastener receiver 796 may provide for a different suspension geometry (e.g., different roll center, camber curve, kingpin axis, caster, and/or other such suspension geometry aspect). In certain other embodiments, one or more control arm frames, such as control arm frame 456 and control arm frame 458 may also include alternative mounting locations for control arm fasteners such as bar pins.

Figure 8:
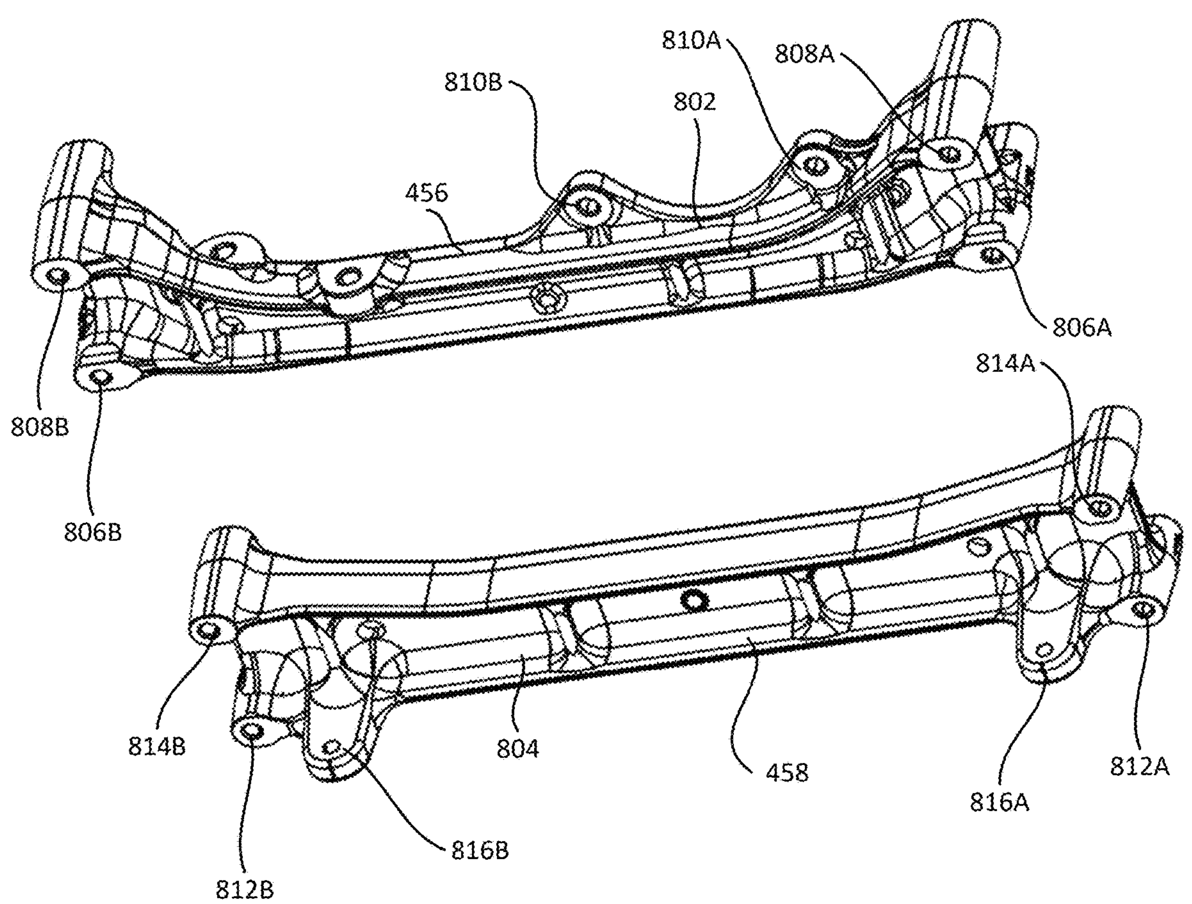
FIG. 8 illustrates control arm subframes of a commercial electric vehicle chassis, in accordance with certain embodiments.

FIG. 8 illustrates control arm subframes of a commercial electric vehicle chassis, in accordance with certain embodiments. FIG. 8 illustrates certain features of control arm frame 456 and control arm frame 458.

Control arm frame 456 may be formed of frame body 802 and control arm frame 458 may be formed of frame body 804. Frame body 802 and/or frame body 804 may be formed from any appropriate technique, such as casting, forging, machining, sheetmetal bending, molding, welding, fastening, and/or other such techniques. In various embodiments, frame body 802 and/or frame body 804 may be made from metal, composite, plastic, wood, and/or other such appropriate materials.

Control arm frame 456 may include fastener receivers 808A and 808B as well as fastener receivers 806A and 806B. Fastener receivers 808A and 808B as well as fastener receivers 806A and 806B may be configured to receive certain fasteners, such as fasteners for coupling one or more bar pins or other control arm mounts to control arm frame 456. In certain embodiments, fastener receivers 808A and 808B and/or fastener receivers 806A and 806B may be through holes, threaded holes, inserts, and/or other features that are configured to receive a fastener to semi-permanently couple a control arm to control arm frame 456.

Control arm frame 456 may further include mounting locations 810A and 810B. Mounting locations 810A and 810B may be configured to receive one or more components of the commercial electric vehicle, such as component 482. Mounting locations 810A and 810B may be, in various embodiments, through-holes, threaded holes, quick release mechanisms, threaded inserts, forms, snaps, and/or other such features configured for components to couple onto.

Control arm frame 458 may include fastener receivers 814A and 814B as well as fastener receivers 812A and 812B. Fastener receivers 814A and 814B and fastener receivers 812A and 812B may be fastener receivers as described herein and may be configured to receive one or more fasteners to couple a control arm to control arm frame 458. Control arm frame 456 may further include mounting locations 816A and 816B. Mounting locations 816A and 816B may be configured to receive one or more components of the commercial electric vehicle. For example, mounting locations 816A and 816B may be configured for mounting of anti-roll bar 480. Mounting locations 816A and 816B may utilize any type of appropriate mounting technique, such as through-holes, threaded holes, quick release mechanisms, threaded inserts, forms, snaps, and/or other such features configured for components to couple onto.

Manufacturing and Operation Examples

Figure 9:
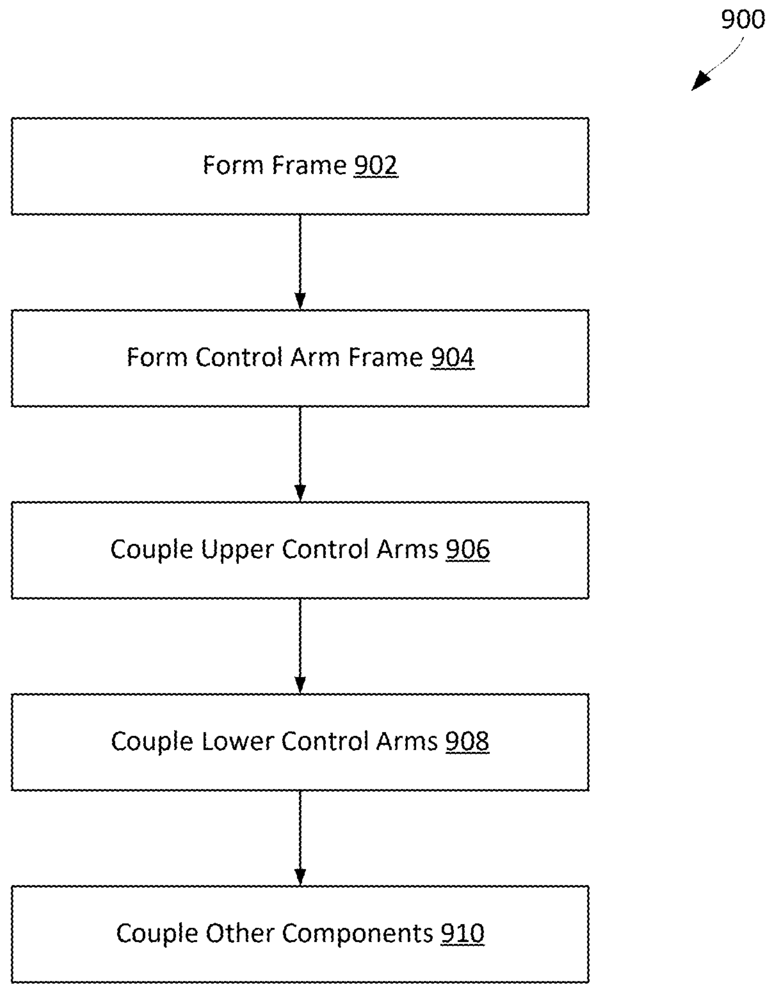
FIG. 9 is a flow chart illustrating a technique of forming a commercial electric vehicle chassis, in accordance with certain embodiments.

FIG. 9 is a flow chart illustrating a technique of forming a commercial electric vehicle chassis, in accordance with certain embodiments. FIG. 9 illustrates technique 900 for manufacturing a commercial electric vehicle with one or more control arm frames.

In 902, the frame of the electric vehicle may be formed. The frame may be, for example, a ladder frame that includes a plurality of frame rails. The ladder frame may be an industry standardized width.

In 904, control arm frames are formed, separately from the forming of the ladder frame. Forming of the control arm frames may include, for example, casting, forgoing, sheet-metal bending and welding, composite layup and curing, molding, mitering and welding, and/or another appropriate technique for forming metal or composite control arms. Once formed, the control arm frame(s) may be coupled to the ladder frame of the vehicle. The control arm frame(s) may be coupled according to the ladder frame via any technique described herein.

In 906, upper control arms may be coupled to the commercial vehicle. Variously, the upper control arms may be coupled to the ladder frame and/or the control arm frame, according to the techniques described herein. In certain embodiments, the upper control arms may be coupled to a specific location or to one of a plurality of different adjustable locations.

In 908, lower control arms may be coupled to the commercial vehicle, similar to the upper control arms. The lower control arms may be coupled to the ladder frame and/or the control arm frame. In certain embodiments, the lower control arms may be coupled to one or more control arm frames, which may be disposed below the ladder frame, as described herein.

In 910, other components may be coupled to the commercial electric vehicle. Such components may be coupled to the control arm frame, ladder frame, and/or another portion of the commercial electric vehicle. For example, such components may include upfitting components for the commercial electric vehicle. The commercial electric vehicle may then be fully assembled.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A commercial electric vehicle comprising:
- a ladder frame, comprising a first frame rail and a second frame rail;
- a first control arm frame, disposed below the first frame rail and the second frame rail and coupled to the first frame rail and the second frame rail;
- a second control arm frame, disposed below the first frame rail and the second frame rail and coupled to the first frame rail and the second frame rail;
- a first suspension, comprising:
  - an first upper control arm assembly, coupled to the first frame rail; and
  - a first lower control arm assembly, coupled to the first control arm frame, wherein a first portion of the first lower control arm assembly is coupled to the first control arm frame, and wherein a second portion of the first lower control arm assembly is coupled to the second control arm frame;
- an electric motor, disposed between the first frame rail and the second frame rail; and
- a battery pack, configured to provide electrical power to the electric motor, wherein at least a first portion of the battery pack is disposed between the first frame rail and the second frame rail, and wherein at least a second portion of the battery pack is disposed above the first control arm frame.

2. The commercial electric vehicle of claim 1, wherein the second control arm frame is disposed behind the first control arm frame.

3. The commercial electric vehicle of claim 2, further comprising:
- an anti-roll bar; and
- an anti-roll bar bracket, coupled to the anti-roll bar and connected to the first control arm frame to secure the anti-roll bar to the first control arm frame at a substantially fixed distance.

4. The commercial electric vehicle of claim 1, wherein the first upper control arm assembly is coupled to the ladder frame at a first point, wherein the first lower control arm assembly is coupled to the first control arm frame at a second point laterally offset from the first point.

5. The commercial electric vehicle of claim 4, wherein the second point is inboard of the first point.

6. The commercial electric vehicle of claim 1, wherein the first lower control arm assembly comprises:
- a bushing; and
- a bar pin, disposed within the bushing, wherein the bar pin is coupled to the first control arm frame.

7. The commercial electric vehicle of claim 1, wherein the first upper control arm assembly comprises an upper control arm, wherein the first lower control arm assembly comprises a lower control arm, and wherein the lower control arm is longer than the upper control arm.

8. The commercial electric vehicle of claim 1, wherein the first suspension further comprises:
- an upright, coupled to the first upper control arm assembly and the first lower control arm assembly; and
- a wheel, coupled to the upright.

9. The commercial electric vehicle of claim 1, wherein the second control arm frame is disposed behind the first control arm frame.

10. The commercial electric vehicle of claim 1, wherein the first frame rail comprises a vertical portion, a top horizontal portion coupled to the vertical portion, and a bottom horizontal portion coupled to the vertical portion, and wherein the first control arm frame is coupled to the bottom horizontal portion.

11. A commercial electric vehicle comprising:
- a ladder frame, comprising a first frame rail and a second frame rail;
- a first control arm frame, disposed below the first frame rail and the second frame rail and coupled to the first frame rail and the second frame rail;
- a first suspension, comprising:
  - an first upper control arm assembly, coupled to the first frame rail; and
  - a first lower control arm assembly, coupled to the first control arm frame and comprising:
    - a bushing; and
    - a bar pin, disposed within the bushing, wherein the bar pin is coupled to the first control arm frame;
- a first fastener, wherein the first fastener couples the bar pin to the first control arm frame and further couples the first control arm frame to the first frame rail
- an electric motor, disposed between the first frame rail and the second frame rail; and
- a battery pack, configured to provide electrical power to the electric motor, wherein at least a first portion of the battery pack is disposed between the first frame rail and the second frame rail, and wherein at least a second portion of the battery pack is disposed above the first control arm frame.

12. The commercial electric vehicle of claim 11, wherein the first control arm frame comprises a first frame attachment point and a second frame attachment point, wherein each of the first frame attachment point and the second frame attachment point are configured to couple to the first lower control arm assembly, and wherein the first lower control arm assembly is coupled to the first frame attachment point.

13. The commercial electric vehicle of claim 11, wherein the first frame rail comprises a first rail attachment point and a second rail attachment point, wherein each of the first rail attachment point and the second rail attachment point are configured to couple to the first upper control arm assembly, and wherein the first lower control arm assembly is coupled to the first rail attachment point.

14. The commercial electric vehicle of claim 11, wherein the first upper control arm assembly comprises an upper control arm, wherein the first lower control arm assembly comprises a lower control arm, and wherein the lower control arm is longer than the upper control arm.

15. A commercial electric vehicle comprising:

a ladder frame, comprising a first frame rail and a second frame rail;

a first control arm frame, disposed below the first frame rail and the second frame rail and coupled to the first frame rail and the second frame rail;

a first suspension, comprising:

an first upper control arm assembly, coupled to the first frame rail; and a first lower control arm assembly, coupled to the first control arm frame;

a second suspension, disposed opposite the first suspension on the commercial electric vehicle and comprising:

a second upper control arm assembly, coupled to the second frame rail; and a second lower control arm assembly, coupled to the first control arm frame an electric motor, disposed between the first frame rail and the second frame rail; and a battery pack, configured to provide electrical power to the electric motor, wherein at least a first portion of the battery pack is disposed between the first frame rail and the second frame rail, and wherein at least a second portion of the battery pack is disposed above the first control arm frame.

16. The commercial electric vehicle of claim 15, wherein:

the first suspension further comprises a first damper;

the second suspension further comprises a second damper;

the first frame rail comprises a first shock mount, wherein the first damper is coupled to the first shock mount; and the second frame rail comprises a second shock mount, and wherein the second damper is coupled to the second shock mount.

17. The commercial electric vehicle of claim 16, further comprising:

a shock mount brace, coupled to and spanning across the first shock mount and the second shock mount.

18. The commercial electric vehicle of claim 17, wherein the shock mount brace is disposed above the battery pack.

19. The commercial electric vehicle of claim 15, further comprising:

a second control arm frame, disposed below the first frame rail and the second frame rail and coupled to the first frame rail and the second frame rail, wherein the first lower control arm assembly and the second control arm assembly are further coupled to the second control arm frame.

20. The commercial electric vehicle of claim 15, wherein the first control arm frame is of a forged construction.

* * * * *